US007068144B2

(12) United States Patent
Gilbert et al.

(10) Patent No.: US 7,068,144 B2
(45) Date of Patent: Jun. 27, 2006

(54) METHOD AND SYSTEM FOR RE-LEARNING A KEY

(75) Inventors: Carl L. Gilbert, Detroit, MI (US); Riad Ghabra, Dearborn Heights, MI (US); Magda Hakim, Livonia, MI (US)

(73) Assignee: Lear Corporation, Southfield, MI (US)

( * ) Notice: Subject to any disclaimer, the term of this patent is extended or adjusted under 35 U.S.C. 154(b) by 391 days.

(21) Appl. No.: 10/604,434

(22) Filed: Jul. 21, 2003

(65) Prior Publication Data

US 2006/0103501 A1 May 18, 2006

(51) Int. Cl.
*G06F 7/04* (2006.01)

(52) U.S. Cl. .................. 340/5.22; 340/5.24; 340/5.64; 340/5.72

(58) Field of Classification Search .............. 340/5.22, 340/5.24, 5.6, 5.65, 5.7
See application file for complete search history.

(56) References Cited

U.S. PATENT DOCUMENTS 5,144,667 A * 9/1992 Pogue et al. ............... 340/5.72
5,937,065 A * 8/1999 Simon et al. ............... 380/262
5,978,483 A * 11/1999 Thompson et al. ........ 340/5.72
6,617,961 B1 * 9/2003 Janssen et al. ............... 340/5.8
6,658,328 B1 * 12/2003 Alrabady et al. ............ 340/5.2
2001/0028298 A1 * 10/2001 Liden et al. ............... 340/5.22
2003/0149666 A1 * 8/2003 Davies ........................ 705/50
2004/0025039 A1 * 2/2004 Kuenzi et al. .............. 713/193

* cited by examiner

*Primary Examiner*—Brian Zimmerman
*Assistant Examiner*—Clara Yang
(74) *Attorney, Agent, or Firm*—Earl J. LaFontaine

(57) ABSTRACT

A method and system for relearning a previously programmed, authenticated key. The system includes an electronic control module (ECM) and a key. The method begins when the ECM fails to match an identification code (ID) of the key with all active or disabled IDs that are stored within the ECM. Thereafter, the ECM sends a signal to the key by encryption with a default secret code. If the key does not respond to this signal, then the ECM sends a signal to the key by encryption with one of a series of unique secret codes. The key receives this signal and then transmits an encrypted valid response signal to the ECM. The ECM extracts a key password from the encrypted valid response signal and compares this key password to a module password. Thereafter, the ECM determines that the passwords are identical and the ECM stores the key ID.

21 Claims, 5 Drawing Sheets

METHOD AND SYSTEM FOR RE-LEARNING A KEY

TECHNICAL FIELD

The present invention relates generally to key-actuated security systems, and more particularly to a method and system for re-learning a previously programmed key.

BACKGROUND OF THE INVENTION

Passive anti-theft systems ("PAT systems") for vehicles are well known. Typical PAT systems prevent the engine from being started unless at least two general conditions are satisfied. First, the driver must utilize a key having a structure properly configured for turning the cylinder lock of the ignition. Second, the key must also have an identification ("ID"), which matches an ID stored within an electronic control module ("ECM") of the PAT system. In this way, the typical PAT system provides additional security to conventional lock-and-key ignition devices.

The ECM normally learns a key by writing a unique secret code to both the ECM and the key. As is known, this unique secret code is utilized with an encryption algorithm for allowing the ECM and the key to communicate with each other for the purpose of allowing the ECM to authenticate the key. It is also understood that once a typical key is written to, the key is permanently locked and cannot be overwritten.

A drawback of existing ECMs is that they usually are incapable of re-learning a previously programmed key. Specifically, it is understood that on occasion the key's ID, the unique secret code associated with that key, or any combination thereof may have been erased or otherwise disabled in the ECM's memory. For that reason, the ECM cannot recognize the key or communicate with the key for authentication purposes. Moreover, since the key cannot be re-written or re-programmed, the key may be wasted thereby requiring a new unprogrammed key to be purchased and learned by the ECM. Such a result can be somewhat expensive and time-consuming.

Therefore, a need exists for a method and system for re-learning a previously programmed key for allowing the continued use of that key.

SUMMARY OF THE INVENTION

The present invention provides a method and system for re-learning a previously programmed, authenticated key. In one embodiment, the system includes an electronic control module (ECM) and a key for use with the electronic module. The key has an identification code (key ID) stored therein, which is transmitted to the ECM. The ECM includes a memory, which can store one or more active IDs and one or more disabled IDs. The method begins when the ECM fails to match a key ID with all the active or disabled IDs, which are stored within the ECM. Thereafter, the ECM sends a signal to the previously programmed key by encryption with a default secret code. If the key does not understand or respond to this signal, then the ECM sends a signal to the previously programmed key by encryption with one of a series of unique secret codes stored within the ECM. The previously programmed key receives this signal and then transmits an encrypted valid response signal to the ECM. The ECM extracts a key password from the encrypted valid response signal and compares the key password to a module password stored within the ECM. Thereafter, the ECM determines that the passwords are identical and then the ECM stores the key identification code.

One advantage of the present invention is that a security system is provided that can utilize previously programmed keys.

Another advantage of the present invention is that a security system is provided that prevents an individual from having to purchase a new unprogrammed key when the ECM does not recognize the previously programmed key.

Still another advantage of the present invention is that a security system is provided that includes substantial authentication protocol, which prevents the system from learning unauthorized, previously programmed keys.

Other advantages of the present invention will become apparent when viewed in light of the detailed description of the invention when taken in conjunction with the attached drawings and appended claims.

BRIEF DESCRIPTION OF THE DRAWINGS

For a more complete understanding of this invention, reference should now be made to the embodiments illustrated in greater detail in the accompanying drawings and described below by way of examples of the invention.

DETAILED DESCRIPTION OF THE INVENTION

Figure 1:
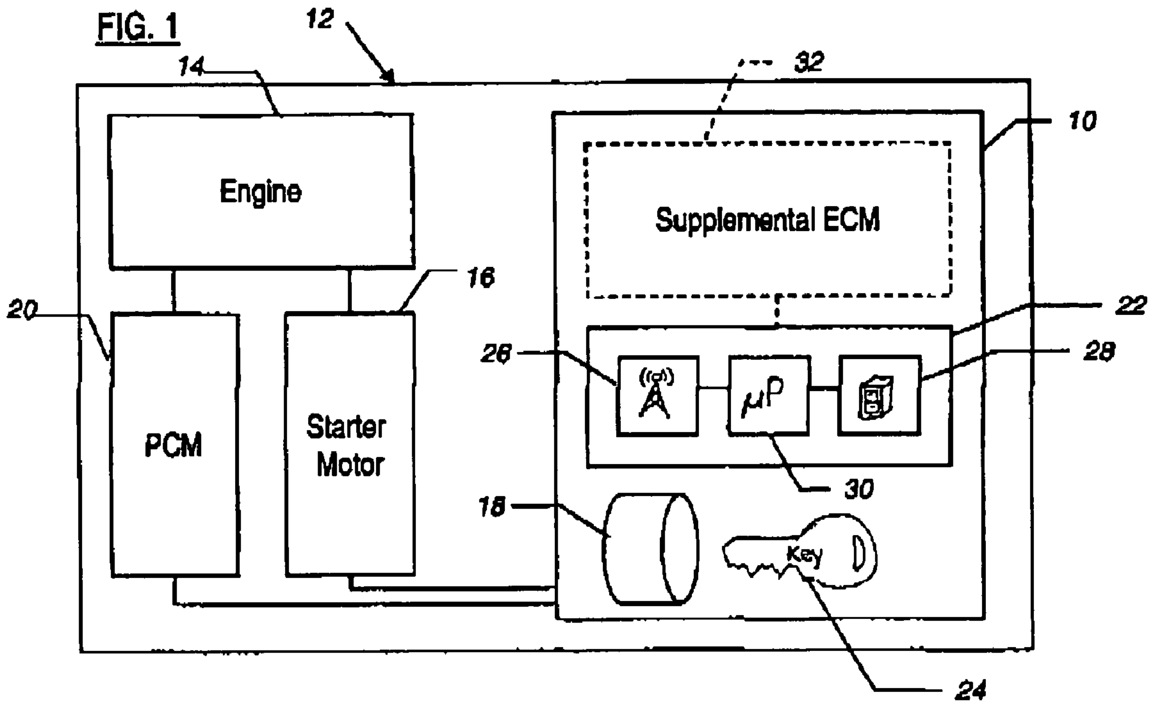
FIG. 1 is a schematic diagram of a security system for re-learning an authorized, previously programmed key, according to one embodiment of the invention.

In the following figures, the same reference numerals are used to identify the same components in the various views. The present invention is particularly suited for a security system integrated within a vehicle. However, it is understood that the present invention may be suited for various other security systems that are utilized in various applications other than a vehicle.

Referring to FIG. 1, there is shown a schematic diagram of a security system 10 integrated within a vehicle 12, according to one embodiment of the present invention. This security system 10 is an engine immobilization system or a passive anti-theft system (PAT system). As is known, a PAT system is intended to prevent a person from utilizing an unauthorized key or other unauthorized tool for starting the engine 14 of the vehicle 12. For example, the security system 10 can be coupled to a starter motor 16 of the vehicle 12 and disable the starter motor 16 until an authorized key is inserted into the ignition 18. Alternatively, the security system 10 can be coupled to a powertrain control module (PCM) 20 and disable that PCM 20 until the authorized key is used. However, it is understood that the security system 10 can be coupled to a variety of other devices within the vehicle 12 so as to immobilize or otherwise protect the vehicle 12.

The security system 10 includes a primary electronic control module (ECM) 22 that is integrated within the vehicle 12 and a key 24 for actuating the ECM 22. It is understood that this key 24 was previously programmed for use with an ECM, which may or may not be the specific ECM 22 of this security system 10. The key 24 has electronic circuitry disposed within its body for storing a key U), a unique secret code, and a key password. As detailed in the descriptions for FIGS. 2–5, the key ID, the unique secret code, and the key password are utilized for authenticating the key 24.

The ECM 22 includes an antenna 26, a memory 28, and a microprocessor 30 that is coupled to both the antenna 26 and the memory 28. This memory 28 includes one or more key IDs, an encryption algorithm, a default secret code, one or more unique secret codes, and one or more module passwords stored therein. The microprocessor 30 retrieves this data from the memory 28 and utilizes the data for executing control logic and authenticating the previously programmed key 24 (as detailed in the descriptions for FIGS. 2–5). As is known, the microprocessor 30 communicates with the key 24 by way of the antenna 26. However, it is understood that the microprocessor 30 may communicate with the key in a variety of other ways.

In another embodiment, the security system 10 further includes a supplemental ECM 32 coupled to the primary ECM 22. This supplemental ECM 32 can be utilized as a backup for storing the key IDs, the unique secret codes, the module passwords, or any combination thereof. In this way, the supplemental ECM 32 can transmit this data to the primary ECM 22 and allow the primary ECM 22 to utilize this data for authenticating the key 24 according to the control logic detailed in the descriptions for FIGS. 2–5. The supplemental ECM 32 is integrated within the vehicle 12. However, it will be appreciated the system 10 can instead include an external database instead of the supplemental ECM 32. For example, this external database can be a device that is separate from the vehicle, e.g. a module that is utilized by service technicians during maintenance checks.

Figure 2:
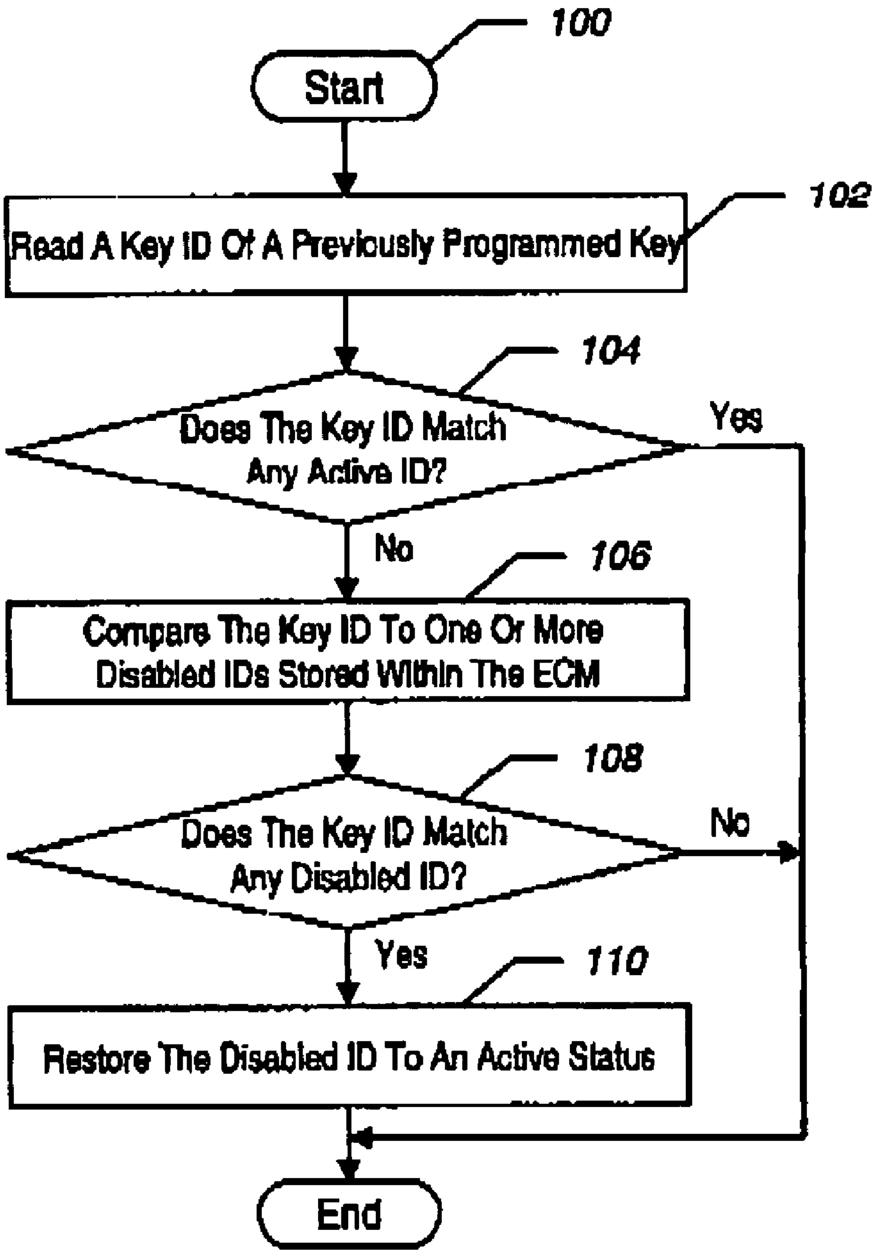
FIG. 2 is a flowchart depicting a method for programming the authorized, previously programmed key into the electronic control module, as shown in FIG. 1, according to one embodiment of the invention.

Referring now to FIG. 2, there is shown a flowchart illustrating a method for programming the previously programmed key 24 into the ECM 22 shown in FIG. 1, according to one embodiment of the invention. The method begins in step 100 and then immediately proceeds to step 102.

In step 102, the ECM 22 receives and reads the key ID. This step is accomplished by transmitting a signal, which contains the key ID, from the key 24 to the ECM's antenna 26. Furthermore, the key ID is then transmitted from the ECM's antenna 26 to the ECM's microprocessor 30. The sequence then proceeds to step 104.

In step 104, the microprocessor 30 retrieves all the active IDs from the ECM's memory 28, compares those IDs to the key ID, and then determines if the key ID fails to match any of the active key IDs. If this condition is met, then the sequence proceeds to step 106. However, if the condition is not met, then the sequence terminates.

In step 106, the microprocessor 30 retrieves one or more disabled IDs from the ECM's memory 28 and compares those disabled IDs to the key ID. One skilled in the art will understand that the ID of the key 24 can become disabled within the ECM 22 when the key 24 is invalidated. Then the sequence proceeds to step 108.

In step 108, the microprocessor 30 determines if the key ID matches any of the disabled IDs from the ECM's memory 28. If this condition is met, then the sequence proceeds to step 110.

In step 110, the microprocessor 30 determines that the key 24 has been authenticated and restores the disabled ID, which matches the key ID, to an active status. Also, it understood that the microprocessor 30 can store a key password of the key 24, which was transmitted with the key ID. Immediately thereafter, the sequence terminates.

However, if in step 108, the microprocessor 30 determines that the key ID fails to match any of the disabled IDs, then the microprocessor 30 determines that the key 24 is not currently authorized and that the key 24 was not previously authorized for use with the ECM 22 of this system 10. As a result, the sequence immediately terminates.

Figure 3:
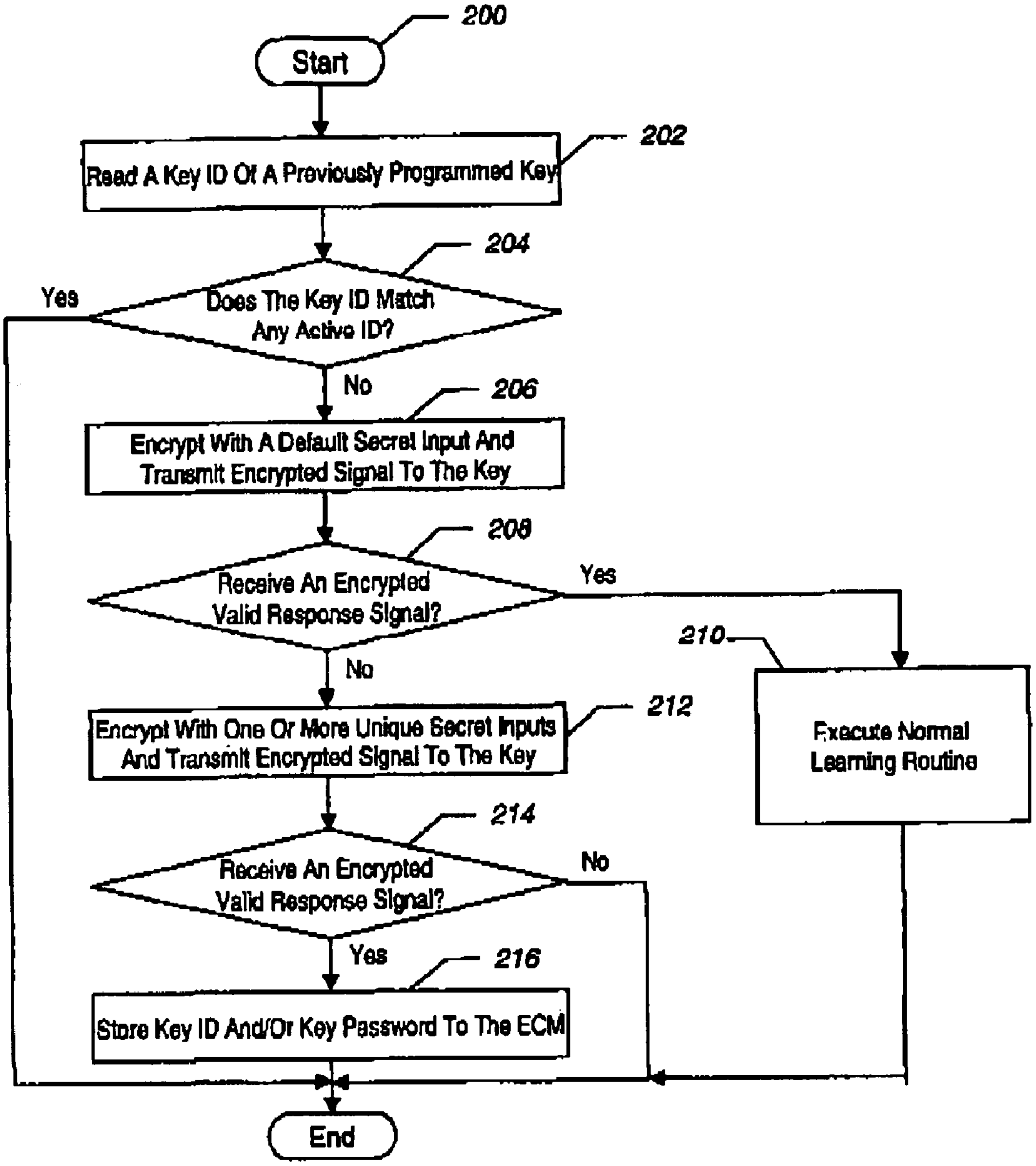
FIG. 3 is a flowchart depicting a method for programming the authorized, previously programmed key into the electronic control module, as shown in FIG. 1, according to another embodiment of the invention.

Referring now to FIG. 3, there is shown a flowchart depicting a method for programming the previously programmed key 24 into the ECM 22 shown in FIG. 1, according to another embodiment of the invention. The method commences in step 200 and then immediately proceeds to step 202.

In step 202, the ECM 22 receives and reads the key ID. Specifically, a signal, which contains the key ID, is transmitted from the key 24 to the ECM's antenna 26. Thereafter, the key ID is then transmitted from the ECM's antenna 26 to the ECM's microprocessor 30. The sequence then proceeds to step 204.

In step 204, the microprocessor 30 retrieves all the active ID's from the ECM's memory 28, compares those IDs to the key ID, and determines if the key ID fails to match any of the active key IDs. If this condition is met, then the sequence proceeds to step 206. However, if this condition is not met, then the sequence terminates.

In step 206, the microprocessor 30 utilizes an encryption algorithm with a default secret code for encrypting a signal having predetermined data. The microprocessor 30 transmits this encrypted signal to the previously programmed key 24. Then, the sequence proceeds to step 208.

In step 208, the microprocessor 30 determines if it has received an encrypted valid response signal from the key 24. Specifically, the key 24 searches the signal, which it received from the ECM 22, for key authentication data. If the key 24 searches the signal and determines that the predetermined data within the signal is identical to the key authentication data, then the key 24 transmits the encrypted valid response signal to the ECM 22 and the sequence proceeds to step 210. In other words, when the ECM 22 receives the encrypted valid response signal from the key 24, the ECM 22 determines that the encryption with the default secret code was successful. Although the valid response signal is described as being encrypted, it will be appreciated that the response signal may not be encrypted as desired.

In step 210, the microprocessor 30 determines that the key 24 is an authorized unprogrammed key that requires programming. Only in this respect of the invention, it is determined that the key 24 was not previously programmed for use with any particular ECM. For that reason, the microprocessor 30 executes a normal learning routine and permanently overwrites the default secret code in the key 24 with a unique secret code. The microprocessor 30 also writes the same unique secret code to its own memory 28 for subsequent authentication of that key 24. Thereafter, the sequence immediately terminates.

However, if in step 208, the microprocessor 30 does not receive an encrypted valid response signal, then the sequence proceeds to step 212. This determination confirms that the key 24 has been previously programmed with a unique secret code for use with a specific ECM. In continuation of the previous example, the key 24 may determine that the predetermined data within the transmitted signal is not identical to the key authentication data stored within the key. As a result, the key 24 does not transmit an encrypted valid response signal to the microprocessor 30. The absence of the encrypted valid response signal indicates to the microprocessor 30 that the encryption was not performed successfully.

In step 212, the microprocessor 30 utilizes an encryption algorithm with a unique secret code for encrypting another signal with predetermined data. The microprocessor 30 transmits this encrypted signal to the key 24. Then, the sequence proceeds to step 214.

In step 214, the microprocessor 30 determines if the microprocessor 30 has received an encrypted valid response signal from the key 24. Specifically, similar to step 208, the key 24 searches the signal, which it received from the ECM 22, for key authentication data. For example, if the key 24 searches the signal and determines that the predetermined data within the signal is identical to the key authentication data, then the key 24 transmits the encrypted valid response signal to the microprocessor 30 and the sequence proceeds to step 216. When the microprocessor 30 receives the encrypted valid response signal from the key 24, the ECM 22 determines that the encryption with the default secret code was successful.

In step 216, the microprocessor 30 receives an encrypted valid response signal from the key 24 and determines that the ECM 22 and the key 24 both utilize a common unique secret code for encryption. In other words, the microprocessor 30 determines that the ECM 22 and the key 24 share private data that allows the two components to communicate with each other. For that reason, the microprocessor 30 determines that the key 24 is authorized for use with the ECM 22 and stores the key ID within the ECM's memory 28. It is understood that, in addition to storing the key ID, the microprocessor 30 can store a key password that is transmitted from the key 24.

However, if in step 214, the ECM 22 does not receive the encrypted valid response signal, then the microprocessor determines that the key 24 is not currently authorized and that the key 24 was not previously programmed for use with the ECM 22. As a result, the sequence immediately terminates.

Figure 4:
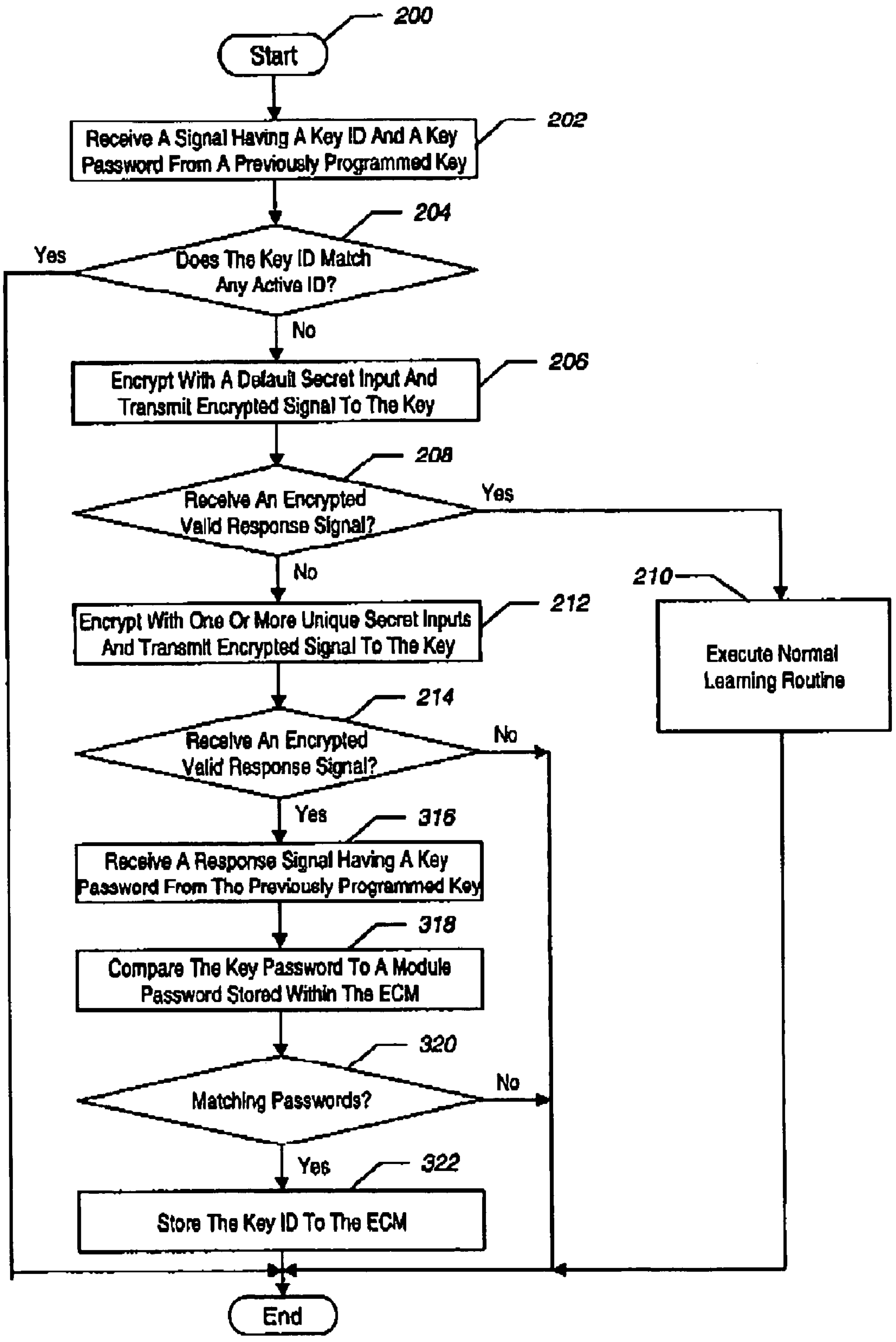
FIG. 4 is a flowchart depicting the method as shown in FIG. 3, including additional authentication protocol, according to yet another embodiment of the invention.

Referring now to FIG. 4, there is shown a flowchart depicting a method for programming a previously programmed key 24 into the ECM 22 shown in FIG. 1, according to still another embodiment of the invention. In this embodiment, the method includes many of the steps of the previous embodiment illustrated in FIG. 3, namely steps 200 through 214. In addition, this method also includes steps 316 through 322 as described below. It will be appreciated that these additional steps create an additional authentication procedure that must be satisfied for the key to be re-learned by the ECM 22 in this embodiment. This method resumes the previous method at step 214.

If in step 214, the microprocessor 30 determines that the encryption with the unique secret code was not successful, then the microprocessor 30 also determines that the key 24 is not authorized for use with the ECM 22. As a result the sequence immediately terminates.

However, if in step 214 the microprocessor 30 determines that the encryption with the unique secret code was successful, then the sequence proceeds to step 316.

In step 316, the microprocessor 30 receives an encrypted valid response signal from the key 24. This response signal includes a key password. Also, it is understood that this response signal may not be encrypted as desired. Then, the sequence proceeds to step 318.

In step 318, the microprocessor 30 compares the key password to one or more module passwords, which are retrieved from the ECM's memory 28. The sequence then proceeds to step 320.

In step 320, the microprocessor 30 determines whether the key password matches the module password. If the passwords are identical, then the sequence proceeds to step 322.

In step 322, the microprocessor 30 determines that the key 24 has been authenticated and then stores the key ID to the ECM's memory 28.

However, if in step 320 the microprocessor 320 determines that the passwords are not identical, then the microprocessor 30 determines that the key is not currently authorized and was not previously programmed for use with the ECM 22. For that reason, the sequence immediately terminates.

Figure 5:
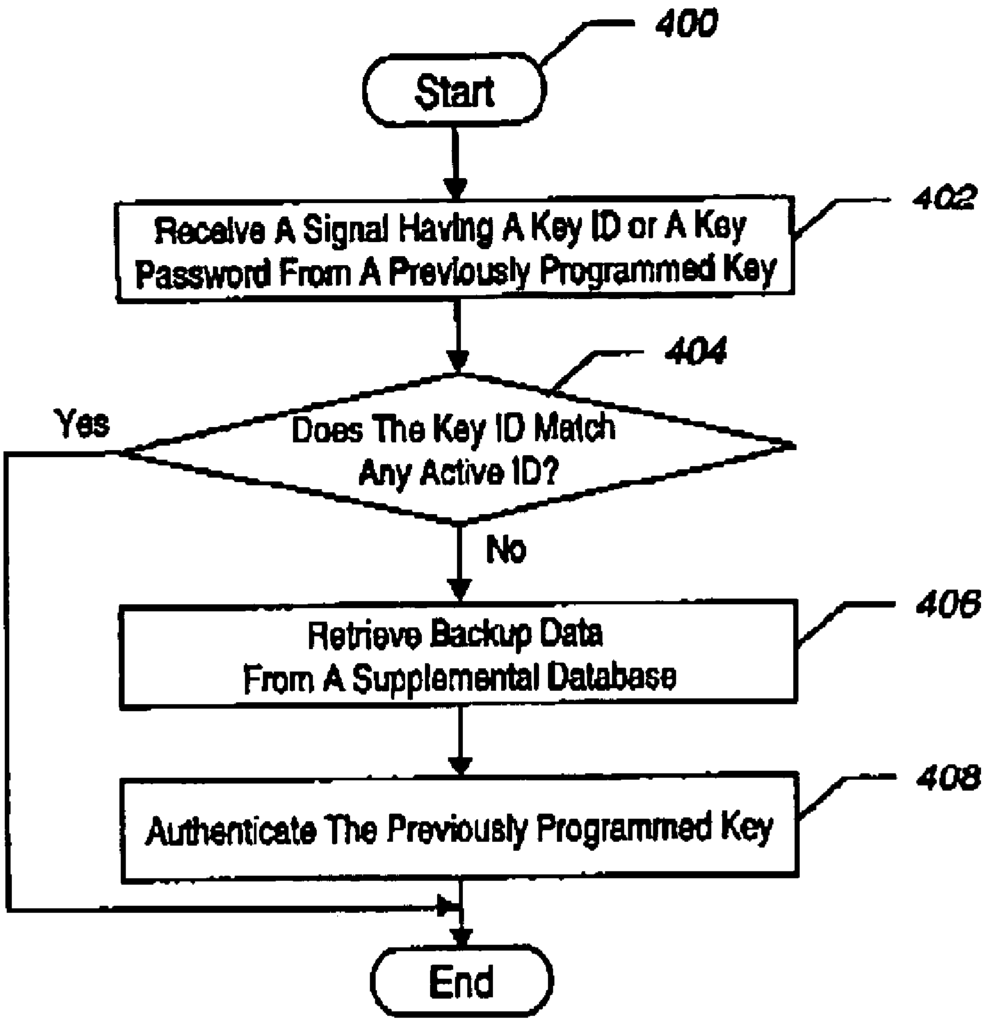
FIG. 5 is a flowchart depicting a method for programming the authorized, previously programmed key into the electronic control module, as shown in FIG. 1, according to still another embodiment of the invention.

Referring now to FIG. 5, there is shown a flowchart depicting a method for re-learning the previously programmed key 24 within ECM 22 shown in FIG. 1, according to yet another embodiment of the invention. The sequence begins in step 400 and then immediately proceeds to step 402.

In step 402, the ECM 22 receives and reads the key ID. This step is accomplished by transmitting a signal, which contains the key ID, from the key 24 to the ECM's antenna 26. Furthermore, the key 1D is then transmitted from the ECM's antenna 26 to the ECM's microprocessor 30. The sequence then proceeds to step 404.

In step 404, the microprocessor 30 retrieves all the active IDs from the ECM's memory 28, compares those active IDs to the key ID, and then determines that key ID fails to match any of the active key IDs. Thereafter, the sequence proceeds to step 406.

In step 406, the microprocessor 30 retrieves backup data from the supplementary database. This supplementary database is a supplementary ECM 32 that is integrated within the vehicle 12. Alternatively, the supplemental database is an external database that is selectively coupled to the ECM 22. It is contemplated that this backup data can include a key ID, a unique secret code, a module password, or any combination thereof. Then, the sequence proceeds to step 408.

In step 408, the microprocessor 30 utilizes the backup data for authenticating the key 24 according to control logic exemplified in the descriptions for FIGS. 2–4. Although FIGS. 2–4 depict how the key ID is re-learned, it should be noted that the ECM 22 can utilize the backup data to re-learn the key ID, the key password, or both the key ID and the key password. For example, the primary ECM 22 may retrieve only the unique secret code from the supplemental ECM 32. In this regard, the primary ECM 22 may utilize the unique secret code to authenticate the key 24 and store the key ID and/or the key password. It is understood that the key ID and the key password are transmitted from the key 24 to the primary ECM 22.

While particular embodiments of the invention have been shown and described, numerous variations and alternate embodiments will occur to those skilled in the art. For example, it is contemplated that any combination of authentication protocol can be utilized, e.g. ID restoration, communication verification, password authentication, and use of supplemental databases. Accordingly, it is intended that the invention be limited only in terms of the appended claims.

What is claimed is:

1. A method for re-learning a previously programmed key within an electronic control module of a security system, comprising:

transmitting a key identification code from the previously programmed key to the electronic control module;

executing an authentication protocol for the previously programmed key;

said authentication protocol comprising the step of comparing said key identification code to a disabled identification code;

restoring said key identification code to an active status within the electronic control module when said key identification code is identical to said disabled identification code.

2. The method as recited in claim 1 wherein executing said authentication protocol comprises:

comparing said key identification code to at least one disabled identification code that is stored within the electronic control module.

3. The method as recited in claim 2 wherein executing said authentication protocol comprises:

determining that said key identification code is identical to at least one disabled identification code stored within the electronic control module.

4. The method as recited in claim 1 wherein executing said authentication protocol comprises:

determining that the previously programmed key and the electronic control module share a common unique secret code, said common unique secret code utilized with an encryption algorithm for encrypting a signal and allowing encrypted communication between the previously programmed key and the electronic control module.

5. The method as recited in claim 4 wherein executing said authentication protocol comprises:

transmitting at least one of said key identification code and said common unique secret code from a supplementary database to the electronic control module.

6. A method for relearning a key within an electronic control module, comprising:

transmitting a key identification code from the previously programmed key to the electronic control module;

executing an authentication protocol for the previously programmed key; and said authentication protocol comprising the step of comparing said key identification code to a disabled identification code;

restoring at least one of a key password and said key identification code to an active status within the electronic control module when said key identification code is identical to said disabled identification code.

7. The method as recited in claim 6 wherein executing said authentication protocol comprises:

determining that the previously programmed key and the electronic control module share a common unique secret code, said common unique secret code utilized with an encryption algorithm for encrypting a signal and allowing encrypted communication between the previously programmed key and the electronic control module.

8. The method as recited in claim 7 wherein determining that the previously programmed key and the electronic control module share a common unique secret code, comprises;

encrypting a signal with said common unique secret code, said signal having a predetermined data;

transmitting said signal from the electronic control module to the previously programmed key; and comparing said predetermined data to a key authentication data stored within the previously programmed key.

9. The method as recited in claim 8 wherein transmitting said valid response signal from the previously programmed key to the electronic control module comprises:

determining that said predetermined data is identical to said key authentication data.

10. The method as recited in claim 8 wherein executing said authentication protocol comprises:

comparing said key password to at least one module password stored within the electronic control module.

11. The method as recited in claim 10 further comprising:

determining that said key password is identical to said at least one module password.

12. The method as recited in claim 6 wherein executing said authentication protocol comprises:

comparing said key identification code to at least one disabled identification code that is stored within the electronic control module.

13. The method as recited in claim 12 further comprising:

determining that said key identification code is identical to said at least one disabled identification code.

14. The method as recited in claim 6 wherein executing said authentication protocol comprises:

transmitting at least one of said key identification code, a unique secret code, and a module password from a supplementary database to the electronic control module.

15. The method as recited in claim 14 further comprising at least one of:

comparing said key identification code to at least one disabled identification code stored in the electronic control module; and comparing said key password to said module password.

16. A security system for re-learning a key into an electronic control module, comprising:

a primary electronic control module comprised of an antenna, a memory, and a microprocessor coupled to said antenna and said memory; and a previously programmed key having electronic circuitry with a key identification code stored therein, said previously programmed key further including a transponder for transmitting said key identification code to said antenna of said primary electronic control module;

said antenna transmitting said key identification code to said microprocessor;

said memory having at least one of a disabled identification code, a unique secret code, and a module password stored therein;

said microprocessor executing an authentication protocol for the previously programmed key, said authentication protocol including comparing said key identification code to said disabled identification code, said microprocessor including control logic for restoring said disabled identification code to an active status when said microprocessor determines that said key identification code is identical to said disabled identification code.

17. The security system of claim 16 wherein said microprocessor includes an encryption algorithm for encrypting a signal with said unique secret code, said microprocessor including control logic for storing said key identification code when said key transmits a valid response signal to said primary electronic control module.

18. The security system of claim 16 wherein said microprocessor includes an encryption algorithm for encrypting a signal with said unique secret code, said microprocessor including control logic for storing said key identification code when said key transmits a key password that is identical to said module password.

19. A security system for re-learning a key into an electronic control module, comprising:

a primary electronic control module comprised of an antenna, a memory, and a microprocessor coupled to said antenna and said memory;

a previously programmed key having electronic circuitry with a key identification code stored therein, said previously programmed key further including a transponder for transmitting said key identification code to said antenna of said primary electronic control module;

said antenna transmitting said key identification code to said microprocessor;

said memory having at least one of a disabled identification code, a unique secret code, and a module password stored therein;

said microprocessor executing an authentication protocol for the previously programmed key, said authentication protocol including comparing said key identification code to said disabled identification code; and at least one of a supplementary electronic control module and an external database;

said supplementary electronic control module coupled to said primary electronic control module and intended to facilitate execution of said authentication protocol, said supplementary electronic control module for transmitting at least one of said key identification code, said unique secret code, and a key password to said primary electronic control module; and said external database selectively coupled to said primary electronic control module and intended to facilitate execution of said authentication protocol, said external database for transmitting at least one of said key identification code, said unique secret code, and said key password to said primary electronic control module.

20. The security system of claim 19 wherein said microprocessor includes an encryption algorithm for encrypting a signal with said unique secret code, said microprocessor including control logic for storing said key identification code when said key transmits a valid response signal to said primary electronic control module.

21. The security system of claim 19 wherein said microprocessor includes an encryption algorithm for encrypting a signal with said unique secret code, said microprocessor including control logic for storing said key identification code when said key transmits a key password that is identical to said module password.

* * * * *